3,077,375
SPINNING OF VISCOSE

Byron N. Baer, Newark, John D. Brandner, Wilmington, and John W. Le Maistre, Claymont, Del., assignors to Atlas Chemical Industries Inc., Wilmington, Del., a corporation of Delaware No Drawing. Original application Aug. 22, 1955, Ser. No. 529,949, now Patent No. 3,031,320, dated Apr. 24, 1962. Divided and this application Dec. 11, 1961, Ser. No. 158,531

4 Claims. (Cl. 18—54)

This invention relates to the regeneration of cellulose from viscose solutions and more particularly to the manufacture of regenerated cellulose articles such as yarn and film from viscose.

It is an object of the invention to provide a process for producing high-tenacity regenerated cellulose yarn having novel and desirable properties.

Another object of the invention is to provide a process for producing high-tenacity regenerated cellulose yarn.

A further object is to provide a process whereby unripened viscose can be spun to produce a high-tenacity, fatigue resistant regenerated cellulose fiber having improved soil and abrasion resistance.

A still further object is to provide novel viscose compositions adapted to the spinning of high-tenacity regenerated cellulose yarns.

The above and other objects will become more apparent in the course of the following description of the invention and in the appended claims.

The above objects are accomplished in accordance with the invention by incorporating in the viscose solution to be spun a compound which is a polyethylene glycol ether of a cyclohexanol or substituted cyclohexanol. The said compound may be represented by the generic formula

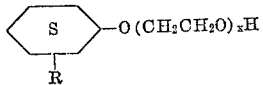

wherein R is hydrogen or an aliphatic hydrocarbon of from 1 to 12 carbon atoms and $x$ is from 2 to 20. The symbol in the hexagon indicates that the ring is saturated. An exemplary list of compounds so-defined includes tetraethylene glycol ether of cyclohexanol, diethylene glycol ether of ethyl cyclohexanol, octaethylene glycol ether of hexyl cyclohexanol, hexaethylene glycol ether of dodecylcyclohexanol, octadecaethylene glycol ether of tertiary amylcyclohexanol, and the like.

The defined compounds useful in the practice of this invention are well known in the art and are readily prepared by the direct addition of ethylene oxide to cyclohexanol or substituted cyclohexanol. See U.S. Patent 2,213,477.

The defined compounds are soluble is viscose solutions and may be incorporated therein at any stage of the viscose process after the cellulose is dissolved. For effective results, from about 0.5% to about 4.0% by weight of the polyethylene glycol ether of the cyclohexanol based on the weight of cellulose in the solution is employed. The composition of the viscose may vary widely as is known in the art. It may be formed from cotton linters or from wood pulp as the source of cellulose, and may contain from 4% to 10% of cellulose in a solution containing from 4.0% to 8.0% of alkali metal hydroxide. The amount of carbon disulfide used in xanthation may be from 25.0% to 50.0%.

The viscose solutions of the invention, i.e., those containing the modified cyclohexanol compounds hereinbefore defined, may be employed in the normal manner for the production of regenerated cellulose films, and yarns. Suitable spinning or regenerating baths contain sulfuric acid, zinc sulfate and sodium sulfate. Preferred spinning baths contain from 4.0% to 12.0% sulfuric acid, from 1.0% to 10.0% zinc sulfate and 13.0% to 25.0% sodium sulfate.

The following non-limiting examples illustrate the preparation of viscose solutions and production of regenerated cellulose yarn therefrom, both in accordance with the invention.

Example I

A cotton linters viscose containing 7% cellulose and 6.6% sodium hydroxide is prepared in conventional manner except that during the dissolution of the xanthated cellulose in aqueous sodium hydroxide, 1% by weight of the tetraethylene glycol ether of cyclohexanol is added and thoroughly dispersed therein. The resultant viscose solution is spun in an unripened state (high salt index of 7) into a bath of 7% sulfuric acid, 8% zinc sulfate and 20% sodium sulfate. The spinning and processing is carried out on conventional equipment to produce regenerated cellulose yarn of high tensile strength resistant to flexing and abrasion of especial benefit as a tire yarn.

Example II

A viscose containing 6.6% cellulose and 6% sodium hydroxide is modified by the addition of 1.4% of decaethylene glycol ether of nonylcyclohexanol. The modified viscose solution is spun on conventional equipment into a bath of 8% sulfuric acid, 8% zinc sulfate and 20% sodium sulfate. Yarns of smooth surface and high tensile strength resistant to soiling result.

In the illustrative examples, tetraethylene glycol ether of cyclohexanol and decaethylene glycol ether of nonylcyclohexanol have been employed as the viscose modifying agents. Similar improved results may be obtained by employing any of the polyethylene glycol ethers of cyclohexanol or substituted cyclohexanol as defined hereinbefore.

This application is a division of application Serial Number 529,949, filed August 22, 1955, now Patent No. 3,031,320.

What is claimed is:

1. A method of producing regenerated cellulosic structures, which comprises spinning into an acid regenerating bath a viscose containing in solution from 0.5% to 4.0% based on the cellulose content of the viscose of a compound conforming to the generic formula

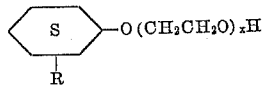

wherein R is selected from the group consisting of hydrogen and aliphatic hydrocarbon radicals of from 1 to 12 carbon atoms and $x$ has any value from 2 to 20.

2. A method of producing regenerated cellulosic structures, which comprises spinning into an acid regenerating bath a viscose containing in solution from 0.5% to 4.0% based on the cellulose content of the viscose of tetraethylene glycol ether of cyclohexanol.

3. A method of producing regenerated cellulosic structures, which comprises spinning into an acid regenerating bath a viscose containing in solution from 0.5% to 4.0% based on the cellulose content of the viscose of decaethylene glycol ether of nonylcyclohexanol.

4. A method of producing regenerated cellulosic structures, which comprises spinning a viscose solution containing from 4.0% to 10.0% cellulose, from 4.0% to 8.0% alkali metal hydroxide and from 0.5% to 4.0% based on the cellulose, of a polyethylene glycol ether of cyclohexanol containing 2 to 20 oxyethylene groups per mol of said ether, into an aqueous sulfuric acid spinning bath containing 4.0% to 12.0% sulfuric acid, 1.0% to 10.0% zinc sulfate and 13.0% to 25.0% sodium sulfate.

References Cited in the file of this patent

UNITED STATES PATENTS

| | | |
|---|---|---|
| 2,213,477 | Steindorff | Sept. 3, 1940 |
| 2,442,331 | Cresswell | June 1, 1948 |
| 2,519,227 | Collins | Aug. 15, 1950 |
| 2,593,466 | MacLavrin | Apr. 22, 1952 |
| 2,648,611 | Richter | Aug. 11, 1953 |
| 2,674,619 | Lundsted | Apr. 6, 1954 |
| 2,677,700 | Jackson et al. | May 4, 1954 |
| 2,705,184 | Drisch | Mar. 29, 1955 |
| 2,710,861 | Charles et al. | June 14, 1955 |
| 2,732,279 | Tachikawa | Jan. 24, 1956 |
| 2,805,169 | Mitchell | Sept. 3, 1957 |